United States Patent
Sasaki

(10) Patent No.: US 8,939,024 B2
(45) Date of Patent: Jan. 27, 2015

(54) ANGULAR VELOCITY SENSOR

(75) Inventor: Takeshi Sasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 271 days.

(21) Appl. No.: 13/394,175

(22) PCT Filed: Sep. 8, 2010

(86) PCT No.: PCT/JP2010/005498
§ 371 (c)(1),
(2), (4) Date: Mar. 5, 2012

(87) PCT Pub. No.: WO2011/030541
PCT Pub. Date: Mar. 17, 2011

(65) Prior Publication Data
US 2012/0167682 A1 Jul. 5, 2012

(30) Foreign Application Priority Data
Sep. 14, 2009 (JP) ................................. 2009-211399

(51) Int. Cl.
*G01P 15/08* (2006.01)
*G01C 19/574* (2012.01)

(52) U.S. Cl.
CPC .................. *G01C 19/574* (2013.01)
USPC ..................................................... 73/504.12

(58) Field of Classification Search
CPC .............. G01C 19/56; G01C 19/5776; G01C 19/5712; G01C 19/5747; G01C 19/5719
USPC ..................................................... 73/504.12
See application file for complete search history.

(56) References Cited

U.S. PATENT DOCUMENTS

| 5,939,630 | A | 8/1999 | Nozoe et al. | |
| 2004/0173022 | A1* | 9/2004 | Nozoe et al. | 73/504.12 |
| 2010/0229645 | A1 | 9/2010 | Aizawa et al. | |

FOREIGN PATENT DOCUMENTS

| EP | 1367367 | 12/2003 |
| JP | 08-327363 | 12/1996 |
| JP | 2002-267448 | 9/2002 |
| JP | 2007-256235 | * 10/2007 |

OTHER PUBLICATIONS

International Search Report of PCT Application No. PCT/JP2010/005498, dated Nov. 30, 2010.

* cited by examiner

*Primary Examiner* — Hezron E Williams
*Assistant Examiner* — Xin Zhong
(74) *Attorney, Agent, or Firm* — Panasonic Patent Center

(57) ABSTRACT

An angular velocity sensor includes a vibrator that vibrates with a drive signal; and a first-sensing-electrode on the vibrator that outputs a first signal containing a first-sense-component generated based on an angular velocity of the vibrator and a first-monitor-component generated based on a drive signal. The sensor includes a second-sensing-electrode on the vibrator that outputs a second signal containing a second-sense-component with a phase substantially the same as that of the first-sense-component and a second-monitor-component with a phase substantially opposite to that of the first-monitor-component; a first-signal-line one end of which is connected to the first-sensing-electrode; and a second-signal-line one end of which is connected to the second-sensing-electrode. The sensor includes a first-sensing-terminal connected to the other ends of the first- and second-signal-lines; and a disconnection-sensing-circuit that outputs a disconnection-sense-signal indicating that the first- or second-signal-line is disconnected, based on a signal from the first-sensing-terminal.

9 Claims, 5 Drawing Sheets

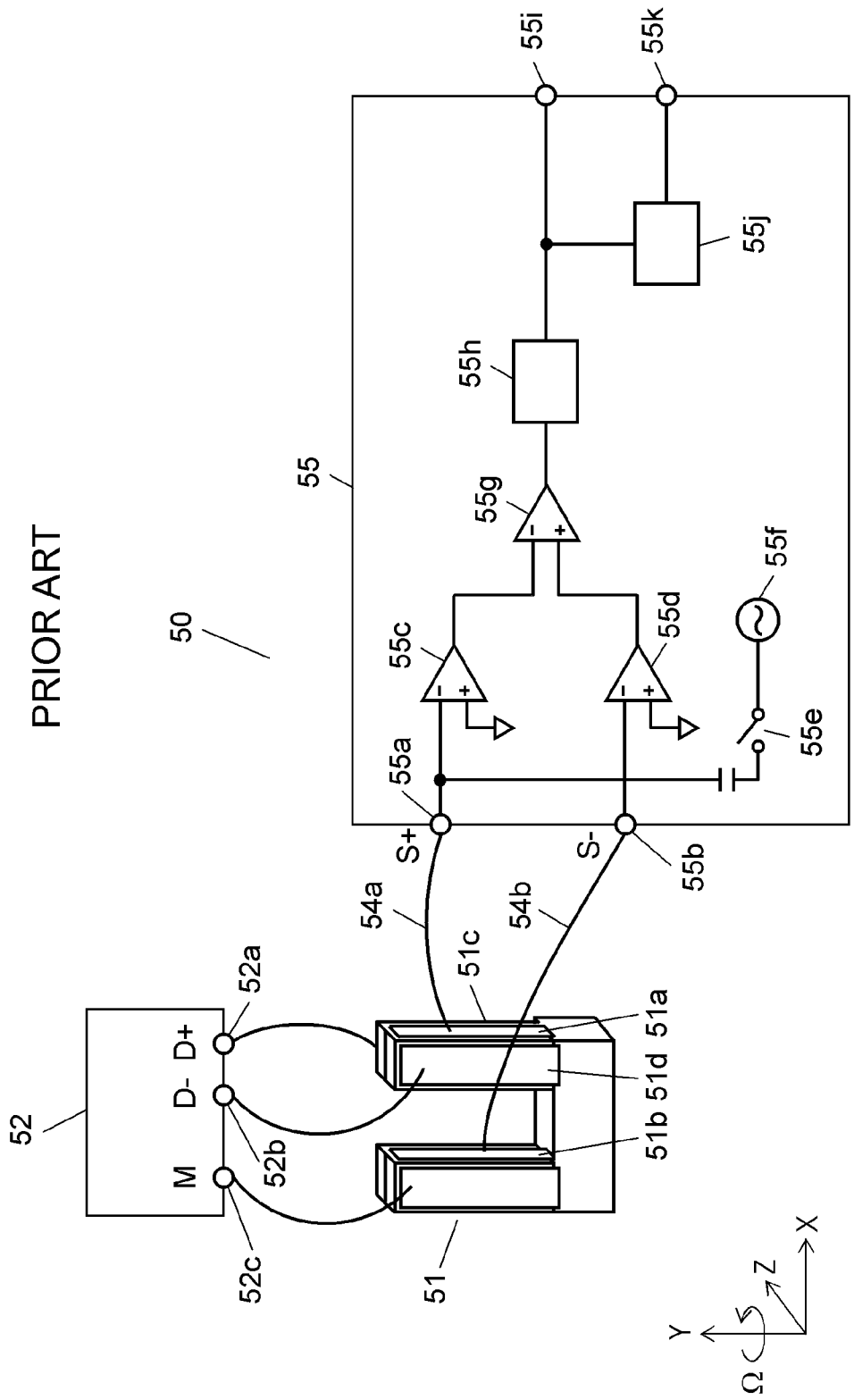

ANGULAR VELOCITY SENSOR

TECHNICAL FIELD

The present invention relates to an angular velocity sensor.

BACKGROUND ART

FIG. 5 is a general block diagram of a conventional angular velocity sensor. As shown in FIG. 5, conventional angular velocity sensor 50 includes vibrator 51, driving circuit 52 for driving vibrator 51, and sensing circuit 55 for sensing angular velocity Ω given to vibrator 51.

Vibrator 51 vibrates by being given drive signals from driving electrodes 51c and 51d, and outputs sense signals with phases opposite to each other generated based on angular velocity Ω given from the outside, to sensing electrodes 51a and 51b, respectively.

Driving circuit 52 outputs drive signals, which are generated by amplifying a signal having been input from monitor terminal 52c, from drive terminals 52a and 52b.

Sensing circuit 55 converts sense signals having been input from sensing terminals 55a and 55b to voltage signals using current-voltage converters 55c and 55d; differentially amplifies the signals using differential amplifier 55g; senses angular velocity Ω using sensing circuit 55; and then outputs the velocity to output terminal 55i.

Angular velocity sensor 50 is configured so that a vibration signal from vibrator 55f can be input to current-voltage converter 55c through switch 55e. Further, sensor 50 includes disconnection sensing circuit 55j that outputs a signal indicating whether abnormality is present or not based on a signal from sensing circuit 55h to disconnection sensing terminal 55k.

To sense abnormality with this configuration, switch 55e is turned on and disconnection sensing circuit 55j monitors a DC fluctuation value to sense abnormality of angular velocity sensor 50.

There is known patent literature 1 for example as information on prior art documents related to the invention of the application.

However, for conventional angular velocity sensor 50 to sense abnormality, switch 55e needs to be turned on, which prevents the sensor from sensing abnormality while being used as an angular velocity sensor.

Signal line 54a connecting sensing electrode 51a with sensing terminal 55a, and signal line 54b connecting sensing electrode 51b with sensing terminal 55b are easily disconnected. However, conventional angular velocity sensor 50 is unable to sense a disconnection in signal lines 54a and 54b.

CITATION LIST

Patent Literature

PTL 1 Japanese patent Unexamined Publication No. 2002-267448

SUMMARY OF THE INVENTION

An angular velocity sensor of the present invention includes a vibrator, a first sensing electrode, a second sensing electrode, a first signal line, a second signal line, a first sensing terminal, and a disconnection sensing unit. The vibrator vibrates by being given a drive signal. The first sensing electrode, formed on the vibrator, outputs a first signal containing a first sense component generated based on an angular velocity given to the vibrator; and a first monitor component generated based on a drive signal. The second sensing electrode, formed on the vibrator, outputs a second signal containing a second sense component with a phase substantially the same as that of the first sense component; and a second monitor component with a phase substantially opposite to that of the first monitor component. One end of the first signal line is connected to the first sensing electrode. One end of the second signal line is connected to the second sensing electrode. The first sensing terminal is connected to the respective other ends of the first and second signal lines. The disconnection sensing unit outputs a disconnection sense signal indicating that the first or second signal line is disconnected, based on a signal output from the first sensing terminal.

This configuration allows the sensor to sense whether or not the first or second signal line is disconnected while being used as an angular velocity sensor.

BRIEF DESCRIPTION OF DRAWINGS

FIG. 5 is a general block diagram of a conventional angular velocity sensor.

DESCRIPTION OF EMBODIMENTS

Hereinafter, a description is made of an embodiment of the present invention with reference to the related drawings. The present invention is not limited by the embodiment.

Exemplary Embodiment

Figure 1:
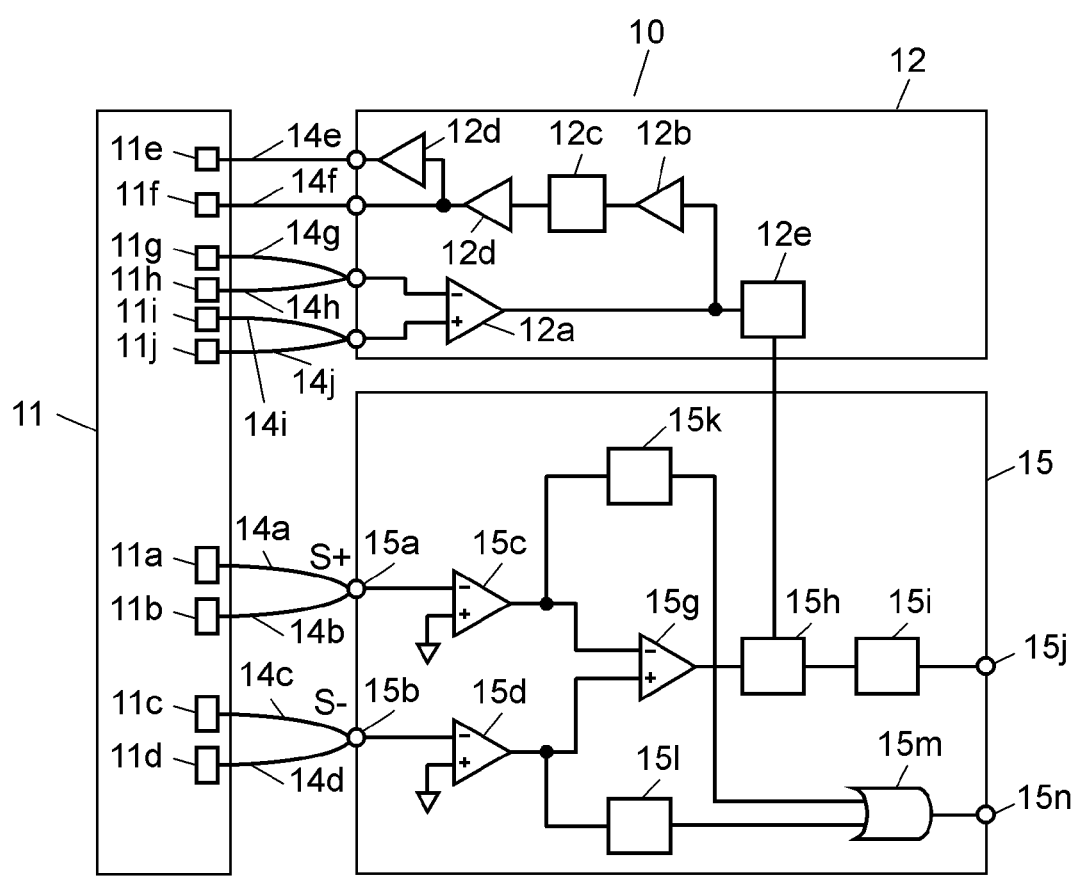
FIG. 1 is a general block diagram of an angular velocity sensor according to an embodiment of the present invention.

FIG. 1 is a block diagram of angular velocity sensor 10 according to an embodiment.

In FIG. 1, angular velocity sensor 10 includes vibrator 11, driving circuit 12 for driving vibrator 11, and sensing circuit 15 for sensing an angular velocity given to vibrator 11.

Vibrator 11 includes sensing electrodes 11a, 11b, 11c, and 11d for outputting sense signals generated based on an angular velocity given to vibrator 11. Further, vibrator 11 includes driving electrodes 11e and 11f into which drive signals for drive-vibrating vibrator 11 are input; and monitoring electrodes 11g, 11h, 11i, and 11j from which monitor signals generated based on drive vibration of vibrator 11 are output.

Here, sensing electrodes 11a, 11b, 11c, and 11d are respectively assumed to be first, second, third, and fourth sensing electrodes.

Driving circuit 12 generates drive signals based on monitor signals input from monitoring electrodes 11g, 11h, 11i, and 11j on vibrator 11 through signal lines 14g, 14h, 14i, and 14j, and outputs the signals to driving electrodes 11e and 11f on vibrator 11 through signal lines 14e and 14f.

Sensing circuit 15 includes sensing terminals 15a and 15b, current-voltage converters 15c and 15d, differential amplifier 15g, detector circuit 15h, low-pass filter 15i, and output terminal 15j. Here, sensing terminals 15a and 15b are respectively assumed to be first and second sensing terminals.

Sensing terminal 15a receives sense signals output from sensing electrodes 11a and 11b on vibrator 11, through signal lines 14a and 14b. Sensing terminal 15b receives sense signals output from sensing electrodes 11c and 11d on vibrator 11, through signal lines 14c and 14d. Current-voltage converters 15c and 15d convert current values of output signals from sensing terminals 15a and 15b to voltage values. Differential amplifier 15g outputs a voltage proportional to the difference voltage between output voltage values from current-voltage converters 15c and 15d. Detector circuit 15h synchronously detects an output signal from differential amplifier 15g using a monitor signal. Low-pass filter 15i smoothes an output signal from detector circuit 15h to produce a DC value. Output terminal 15j outputs the DC value.

Sensing circuit 15 includes disconnection sensing circuits 15k and 15l and logical sum circuit 15m.

Disconnection sensing circuits 15k and 15l output disconnection sense signals based on signals from current-voltage converters 15c 15l, respectively. Logical sum circuit 15m outputs a disconnection sense signal to disconnection sensing terminal 15n based on output signals from disconnection sensing circuits 15k and 15l.

Here, signal lines 14a, 14b, 14c, and 14d are respectively assumed to be first, second, third, and fourth signal lines.

Disconnection sensing circuits 15k and 15l are respectively assumed to be first and second disconnection sensing circuits.

In the configuration of the embodiment, two-series signals (i.e. a signal having been input from sensing terminal 15a and that from sensing terminal 15b) are differentially amplified to increase the sensitivity of sensing the angular velocity. However, the disconnection sensing of the present invention is applicable to a configuration that senses an angular velocity based on only a signal having been input from either one of the sensing terminals.

Hereinafter, a description is made of each component of angular velocity sensor 10.

Driving circuit 12 differentially amplifies monitor signals input through signal lines 14g, 14h, 14i, and 14j using differential amplifier 12a to make the amplitude substantially constant using AGC (Automatic Gain Control) 12b. Further, circuit 12 removes unnecessary frequency components using band pass filter 12c and provides vibrator 11 with drive signals through signal lines 14e and 14f using drive amplifier 12d. This configuration causes vibrator 11 to vibrate at a constant drive vibration frequency. Phase shifter 12e phase-rotates a monitor signal by 90° to output the result to sensing circuit 15.

Vibrator 11 can be of any type as long as it vibrates with a drive signal given from driving circuit 12 and its vibration state changes with an angular velocity given from the outside. When vibrator 11 is drive-vibrated, for example, in the X-axis direction, angular velocity Ω around the Z axis (orthogonal to the X axis) provides a Coriolis force in the Y-axis direction (orthogonal to the X and Z axes). The Coriolis force causes vibrator 11 to sense-vibrates in the Y-axis direction with an amplitude proportional to angular velocity Ω. Sense signals obtained based on this sense vibration are output from sensing electrodes 11a, 11b, 11c, and 11d. Each sense signal contains a sense component (generated based on the sense vibration of vibrator 11) and a monitor component (generated based on the drive vibration of vibrator 11).

Signal lines 14a and 14b are lines for electrically connecting sensing electrodes 11a and 11b provided on vibrator 11 to sensing terminal 15a that is an input terminal of sensing circuit 15. Similarly, signal lines 14c and 14d are lines for electrically connecting sensing electrodes 11c and 11d provided on vibrator 11 to sensing terminal 15b that is another input terminal of sensing circuit 15. Signal lines 14a, 14b, 14c, and 14d, all formed of bonding wires, are easily disconnected due to, for example, excessive vibration and shock.

Here, a monitor component contained in signal line 14a and that in signal line 14b have phases substantially opposite to each other and the same amplitude, and thus the components are cancelled by each other. Consequently, sensing terminal 15a outputs only a sense component. Here, a sense component contained in signal line 14a and that in signal line 14b have substantially the same phase.

In the same way, a monitor component contained in signal line 14c and that in signal line 14d have phases substantially opposite to each other and the same amplitude, and thus the components are cancelled by each other. Consequently, sensing terminal 15b outputs only a sense component. Here, a sense component contained in signal line 14c and that in signal line 14d have substantially the same phase.

Here, a sense component output from sensing terminal 15b has a phase substantially opposite to that from sensing terminal 15a.

Current-voltage converters 15c and 15d convert current components of output signals from sensing terminals 15a and 15b to voltage components.

Differential amplifier 15g outputs a voltage proportional to the difference voltage between output signals from current-voltage converters 15c and 15d.

Detector circuit 15h uses a monitor signal to synchronously sense an output signal from differential amplifier 15g. The sense component contained in the output signal from differential amplifier 15g has a frequency same as that of a monitor signal and a phase delayed by 90°. Accordingly, only a sense component can be extracted by synchronously sensing the monitor signal with its phase shifted forward by 90° with a phase shifter.

Low-pass filter 15i produces a DC value corresponding to a sense component (i.e. a DC value corresponding to angular velocity Ω given to vibrator 11) to smooth an output signal from detector circuit 15h.

Disconnection sensing circuit 15k outputs a disconnection sense signal indicating that either signal line 14a or 14b is disconnected when the level of a signal output from current-voltage converter 15c is higher than a threshold level preliminarily determined.

Disconnection sensing circuit 15l outputs a disconnection sense signal indicating that either signal line 14c or 14d is disconnected when the level of a signal output from current-voltage converter 15d is higher than a threshold level preliminarily determined.

Logical sum circuit 15m outputs a disconnection sense signal to disconnection sensing terminal 15n when disconnection sense signals output from disconnection sensing circuits 15k and/or 15l indicate a disconnection.

Here, disconnection sensing circuits 15k and 15l may be structured to output respective disconnection sense signals to separate terminals. This enables identifying which line is disconnected, signal line 14a or 14b; or signal line 14c or 14d.

Here, a disconnection sense signal output from disconnection sensing terminal 15n may be either analog or digital.

Here, a disconnection sense signal may be superimposed on a signal representing the result of another fault diagnosis to be output from disconnection sensing terminal 15n, which reduces the number of terminals used for fault diagnosis.

Here, a disconnection sense signal may be superimposed on an output signal from low-pass filter 15i to be output from disconnection sensing terminal 15j without disconnection sensing terminal 15n provided, which allows the disconnection sensing terminal to double as the output terminal, thereby reducing the number of terminals.

Figure 2:
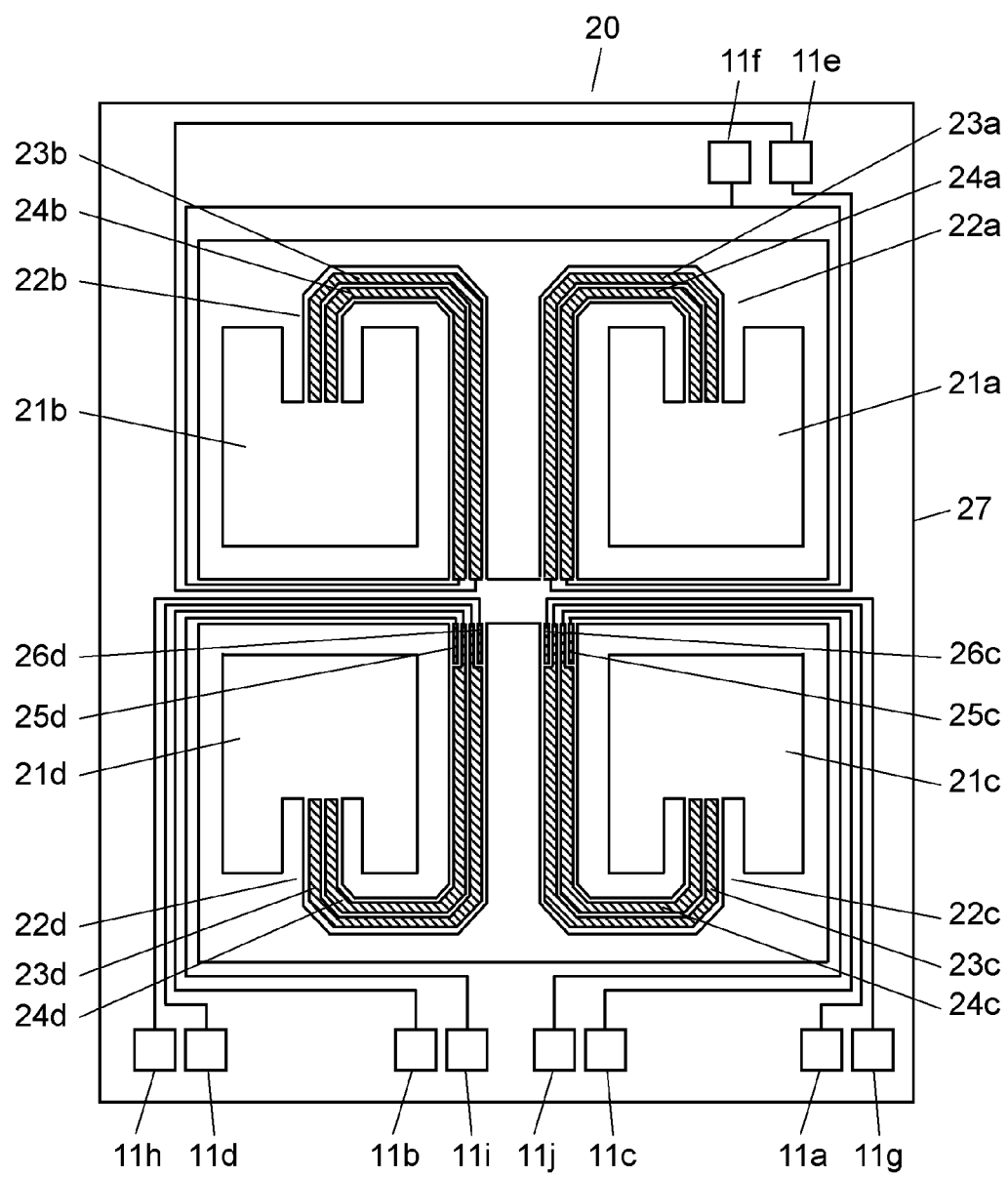
FIG. 2 is a top view of a multi-axis sensing vibrator according to the embodiment of the present invention.
Figure 2:
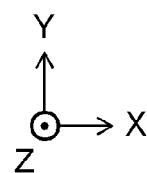

FIG. 2 shows multi-axis sensing vibrator 20, an example of vibrator 11, where vibrator 11 of the present invention is not limited to a configuration with multi-axis sensing vibrator 20. If vibrator 11 vibrates with a drive signal given from driving circuit 12 and its vibration state changes with an angular velocity given from the outside, a disconnection can be sensed by applying the present invention. To sense a one-axis angular velocity for example, it is adequate if one or two weights are provided.

Multi-axis sensing vibrator 20 has four weights: 21a, 21b, 21c, and 21d respectively interlinked with frame 27 through arms 22a, 22b, 22c, and 22d.

Arm 22a has a lamination of a bottom electrode (not shown) and a piezoelectric thin film (not shown). On the top of them, upper electrodes 23a and 24a are formed, which are respectively connected to electrodes 11e and 11f formed on frame 27.

Arm 22b has a lamination of a bottom electrode (not shown) and a piezoelectric thin film (not shown). On the top of them, upper electrodes 23b and 24b are formed, which are respectively connected to electrodes 11e and 11f formed on frame 27.

Arm 22c has a lamination of a bottom electrode (not shown) and a piezoelectric thin film (not shown). On the top of them, upper electrodes 23c, 24c, 25c, and 26c are formed, which are respectively connected to electrodes 11a, 11c, 11j, and 11g formed on frame 27.

Arm 22d has a lamination of a bottom electrode (not shown) and a piezoelectric thin film (not shown). On the top of them, upper electrodes 23d, 24d, 25d, and 26d are formed, which are respectively connected to electrodes 11d, 11b, 11i, and 11h formed on frame 27.

With this configuration, driving circuit 12 amplifies monitor signals output from electrodes 11g, 11h, 11i, and 11j and provides electrodes 11e and 11f with drive signals to drive-vibrate weights 21a, 21b, 21c, and 21d.

For the piezoelectric thin film, a piezoelectric material such as crystal, zinc oxide (ZnO), and lead zirconate titanate (PZT) can be used. Instead of the piezoelectric method, the capacitance method may be used to drive multi-axis sensing vibrator 20.

Figure 3A:
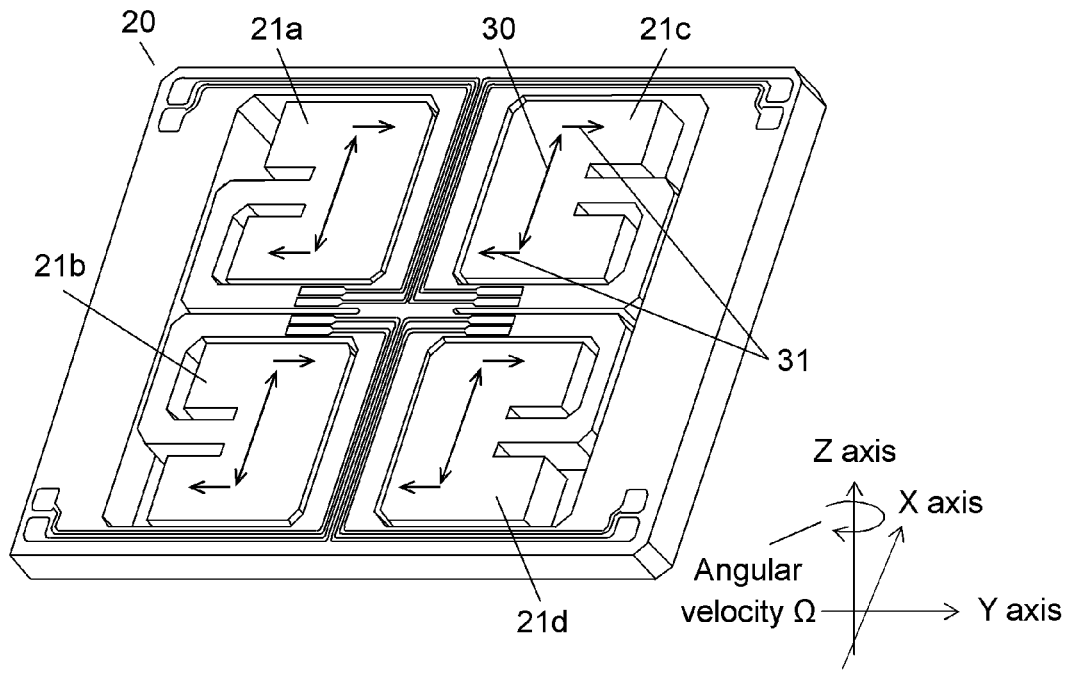
FIG. 3A shows drive vibration and sense vibration of the multi-axis sensing vibrator according to the embodiment of the present invention.
Figure 3B:
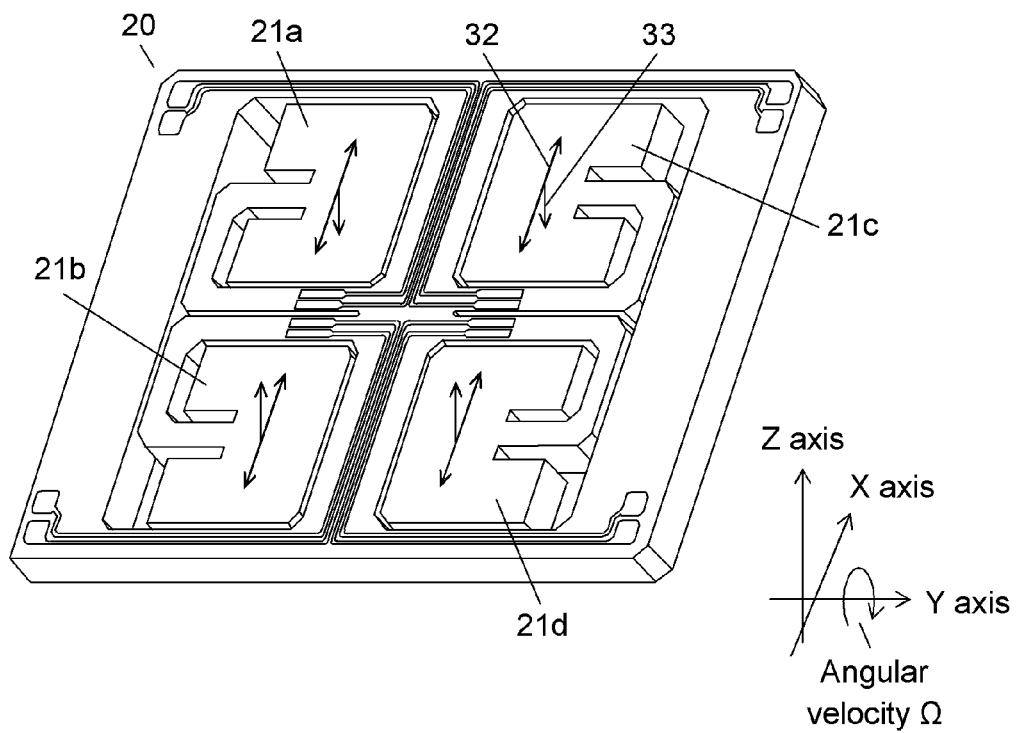
FIG. 3B shows drive vibration and sense vibration of the multi-axis sensing vibrator according to the embodiment of the present invention.

FIGS. 3A and 3B show drive vibration and sense vibration of the multi-axis sensing vibrator according to the embodiment of the present invention. A description is made of drive vibration and sense vibration of multi-axis sensing vibrator 20 using FIGS. 3A and 3B.

FIG. 3A shows a case of sensing angular velocity Ω around the Z axis. When angular velocity Ω around the Z axis is exerted while weights 21a, 21b, 21c, and 21d are vibrated in the direction of drive vibration 30, the weights vibrate in the direction of sense vibration 31 due to a Coriolis force.

FIG. 3B shows a case of sensing angular velocity Ω around the Y axis. When angular velocity Ω around the Y axis is exerted while weights 21a, 21b, 21c, and 21d are vibrated in the direction of drive vibration 32, the weights vibrate in the direction of sense vibration 33 due to a Coriolis force.

Using such multi-axis sensing vibrator 20, sensing circuit 15 can sense angular velocity Ω based on sense signals output from sensing electrodes 11a, 11b, 11c, and 11d.

Here, each signal output from sensing electrodes 11a, 11b, 11c, and 11d contains a current of a sense component obtained based on sense vibration and a monitor component obtained based on drive vibration.

Figure 4:
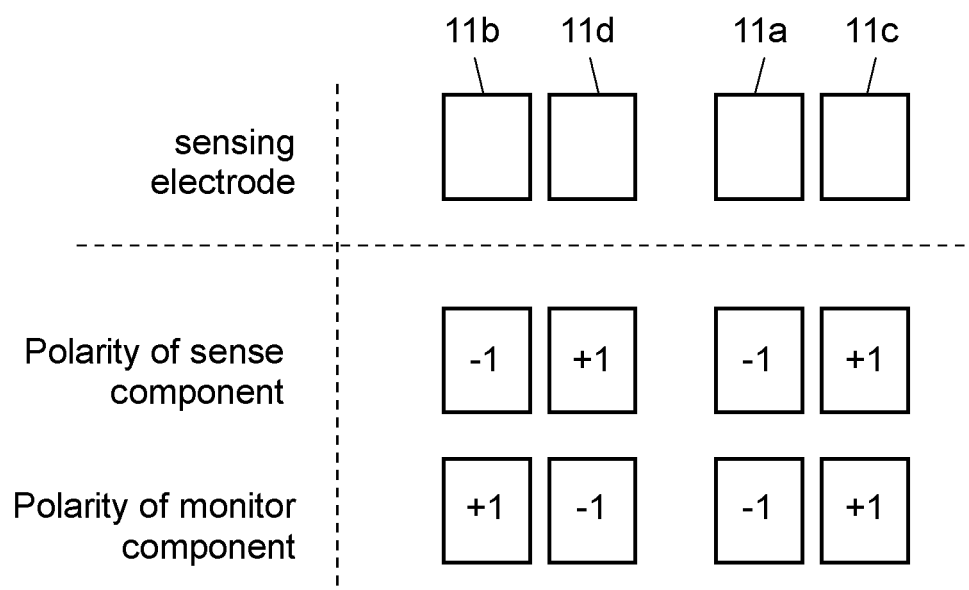
FIG. 4 shows polarities of sensing electrodes according to the embodiment of the present invention.

FIG. 4 shows polarities of the sensing electrodes according to the embodiment of the present invention. A description is made of polarity of a current of a sense component and a monitor component contained in a signal output from each sensing electrode using FIG. 4.

Sensing electrode 11a contains a negative sense component and a negative monitor component.

Sensing electrode 11b contains a negative sense component and a positive monitor component.

Sensing electrode 11c contains a positive sense component and a positive monitor component.

Sensing electrode 11d contains a positive sense component and a negative monitor component.

Upper electrodes 23c, 24c, 23d, and 24d have substantially the same area size, which means that the currents of the respective sense components contained in sensing electrodes 11a, 11b, 11c, and 11d have substantially the same amplitude, and so do the currents of the respective monitor components.

Here, each displacement amount of weights 21a, 21b, 21c, and 21d of multi-axis sensing vibrator 20 due to drive vibration is larger than that due to sense vibration, and thus each amplitude of currents of monitor components contained in upper electrodes 23c, 24c, 23d, and 24d is larger than that of sense components. For example, when an angular velocity of 1 deg/s is exerted around the Z axis while weights 21a, 21b, 21c, and 21d are drive-vibrated with a displacement amount of 20 μm, each of upper electrodes 23c, 24c, 23d, and 24d outputs a current of a monitor component of approximately 50 μA and that of a sense component of approximately 75 pA, where these values vary depending on such as shapes of a weight and an arm.

Here, this relationship is not limited to multi-axis sensing vibrator 20 shown as an example, but the amplitude of a current of a monitor component is larger than that of a sense component for a vibrator with its displacement amount due to drive vibration of the weights larger than that due to sense vibration.

As described above, the monitor components are canceled by each other at sensing terminals 15a and 15b of sensing circuit 15. More specifically, sensing electrode 11a connected to sensing terminal 15a through signal line 14a contains a negative monitor component; sensing electrode 11b connected to sensing terminal 15a through signal line 14b contains a positive monitor component, and thus the monitor components with phases opposite to each other are canceled at sensing terminal 15a.

In the same way, sensing electrode 11c connected to sensing terminal 15b through signal line 14c contains a positive monitor component; sensing electrode 11d connected to sensing terminal 15b through signal line 14d contains a negative monitor component, and thus the monitor components with phases opposite to each other are canceled at sensing terminal 15b.

Here, when either signal line 14a or 14b is disconnected, monitor components are not canceled at sensing terminal 15a but an excessive current is input to current-voltage converter 15c. When the amount of a current input to current-voltage converter 15c is within the dynamic range of current-voltage converter 15c, a voltage value corresponding to the current amount is output; otherwise, the saturated voltage value is output. When either signal line 14c or 14d is disconnected, current-voltage converter 15d operates in the same way.

Thus, when signal lines 14a, 14b, 14c, and 14d connecting vibrator 11 with sensing circuit 15 are disconnected, current-voltage converters 15c and 15d output excessive voltage values. Consequently, output terminal 15j outputs a value larger than that representing angular velocity Ω having been given to vibrator 11.

Hence in the present invention, disconnection sensing circuit 15k is used to sense that signal line 14a or 14b is disconnected, and disconnection sensing circuit 15l is used to sense that signal line 14c or 14d is disconnected. When disconnection sensing circuit 15k and/or 15l sense a disconnection, logical sum circuit 15m outputs a disconnection sense signal. Disconnection sensing circuits 15k and 15l and logical sum circuit 15m compose a disconnection sensing unit, which allows the unit to inform that a signal output from output terminal 15j represents an abnormal value.

Thus, the present invention positively uses the fact that signal lines 14a and 14b contain monitor components with phases opposite to each other and the monitor signals are cancelled at sensing terminal 15a to sense that signal line 14a or 14b is disconnected and that signal line 14c or 14d is disconnected in the same way.

Such a configuration allows sensing a disconnection without requiring angular velocity sensor 10 to be in a special state for sensing (a conventional way) while always being functioned as an angular velocity sensor.

To sense a disconnection, the following concrete method is used. That is, disconnection sensing circuit 15k senses the level of a signal output from current-voltage converter 15c and compares the level sensed to a threshold preliminarily determined. When the level is higher than the threshold, circuit 15k outputs a disconnection sense signal. In the same way, when the level of a signal output from current-voltage converter 15d is higher than a threshold preliminarily determined, circuit 15l outputs a disconnection sense signal.

The threshold preliminarily determined is desirably higher than the highest level of a sense component. This is because of the following reason. That is, a monitor component is considerably larger than a sense component as described above. Consequently, the monitor component is not cancelled at sensing terminal 15a when either signal line 14a or 14b is disconnected, and thus the monitor component reaches a considerably high level compared to the highest level of the sense component. Desirably, the threshold preliminarily determined is made the highest level of a signal that can be input when no line is disconnected. This prevents a disconnection sense signal from being output even if an unnecessary signal component due to a factor other than a disconnection is contained, which increases accuracy in sensing a disconnection.

Here, disconnection sensing circuits 15k and 15l may sense a disconnection based on a signal output from sensing terminals 15a and 15b.

INDUSTRIAL APPLICABILITY

An angular velocity sensor of the present invention can sense whether or not a signal line connecting a sensing electrode with its sensing terminal is disconnected while being used as an angular velocity sensor, which is useful for sensing a disconnected signal line.

REFERENCE MARKS IN THE DRAWINGS

10 Angular velocity sensor
11 Vibrator
11a, 11b, 11c, 11d Sensing electrode
11e, 11f Driving electrode
11g, 11h, 11i, 11j Monitoring electrode
12 Driving circuit
14a, 14b, 14c, 14d, 14e Signal line
14f, 14g, 14h, 14i, 14j Signal line
15 Sensing circuit
15a, 15b Sensing terminal
15c, 15d Current-voltage converter
15g Differential amplifier
15h Detector circuit
15i Low-pass filter
15j Output terminal
15k, 15l Disconnection sensing circuit
15m Logical sum circuit
15n Disconnection sensing terminal
20 Multi-axis sensing vibrator
21a, 21b, 21c, 21d Weight
22a, 22b, 22c, 22d Arm
23a, 23b, 23c, 23d Electrode
24a, 24b, 24c, 24d Electrode
25c, 25d Electrode
26c, 26d Electrode
27 Frame
30, 32 Drive vibration
31, 33 Sense vibration

The invention claimed is:

1. An angular velocity sensor comprising:
a vibrator including an arm and a weight on an XY plane composed of an X axis and a Y axis perpendicular to each other;
a driving circuit for driving the vibrator; and
a sensing circuit for sensing angular velocity given to the vibrator,
wherein the vibrator includes a first sensing electrode on the arm, a second sensing electrode on the arm, a third sensing electrode on the arm and a fourth sensing electrode on the arm;
wherein a monitor signal from a monior electrode on the vibrator is input into the driving circuit, and the driving circuit outputs a driving signal to a driving electrode on the vibrator,
wherein the sensing circuit includes:
a first sensing terminal connected to the first sensing electrode by a first signal line and connected to the second sensing electrode by a second signal line;
a second sensing terminal connected to the third sensing electrode by a third signal line and connected to the fourth sensing electrode by a fourth signal line;
a first disconnection sensing circuit; and
second disconnection sensing circuit,
wherein the first sensing electrode outputs a first signal containing a first sense component and a first monitor component,
wherein the second sensing electrode outputs a second signal containing a second sense component with a phase substantially the same as a phase of the first sense component and a second monitor component with a phase substantially opposite to a phase of the first monitor component,
wherein the third sensing electrode outputs a third signal containing a third sense component with a phase substantially opposite to a phase of the first sense component and a third monitor component with a phase substantially the same as a phase of the first monitor component,
wherein the fourth sensing electrode outputs a third signal containing a fourth sense component with a phase substantially opposite to a phase of the first sense component and a fourth monitor component with a phase substantially opposite to a phase of the first monitor component,
wherein a signal output from the first sensing terminal is input into the sensing circuit, and the sensing circuit senses an angular velocity around a Z axis substantially perpendicular to the X axis and the Y axis, wherein a signal output from the first sensing terminal is input into the first disconnection sensing circuit, and the first disconnection sensing circuit outputs a first disconnection sense signal showing that the first signal line or the second signal line is disconnected, and wherein a signal output from the second sensing terminal is input into the second disconnection sensing circuit, and the second disconnection sensing circuit outputs a disconnection sense signal showing that the third signal line or the fourth signal line is disconnected.

2. The angular velocity sensor of claim 1, wherein the first disconnection sensing circuit outputs the first disconnection sense signal when a level of a signal output from the first sensing terminal is equal to or higher than a given level.

3. The angular velocity sensor of claim 1, further comprising a current-voltage converter connected to an output side of the first sensing terminal, wherein the first disconnection sensing circuit outputs the first disconnection sense signal when a level of a signal output from the current-voltage converter is equal to or higher than a given level.

4. The angular velocity sensor of claim 1, further comprising:

a logical sum circuit for outputting a disconnection sense signal in a case where at least one of the first disconnection sensing signal supplied from the first disconnection sensing circuit and the second disconnection sensing signal supplied from the second disconnection sensing circuit indicates a disconnection.

5. The angular velocity sensor of claim 1, wherein an amplitude of the first monitor component is higher than an amplitude of the first sense component, and wherein an amplitude of the second monitor component is higher than an amplitude of the second sense component.

6. The angular velocity sensor of claim 1, wherein an amplitude of the third monitor component is higher than an amplitude of the third sense component, and wherein an amplitude of the fourth monitor component is higher than an amplitude of the fourth sense component.

7. The angular velocity sensor of claim 1, wherein the first disconnection sensing circuit outputs the first disconnection sense signal when a level of a signal output from the first sensing terminal is outside of a predetermined range.

8. The angular velocity sensor of claim 1, further comprising a current-voltage converter connected to an output side of the first sensing terminal, wherein the first disconnection sensing circuit outputs the first disconnection sense signal when a level of a signal output from the current-voltage converter is outside of a predetermined range.

9. The angular velocity sensor of claim 1, further comprising:

a logical operation circuit for outputting a disconnection sense signal in a case where at least one of the first disconnection sensing signal supplied from the first disconnection sensing circuit and the second disconnection sensing signal supplied from the second disconnection sensing circuit indicates a disconnection.

* * * * *